United States Patent
Chen et al.

(10) Patent No.: US 11,383,748 B2
(45) Date of Patent: Jul. 12, 2022

(54) STEERING WHEEL FOR A VEHICLE INCORPORATING A GRAPHENE THERMO-ELECTRIC ELEMENT

(71) Applicant: GM GLOBAL TECHNOLOGY OPERATIONS LLC, Detroit, MI (US)

(72) Inventors: Huzuanxu Chen, Shanghai (CN); David A. Stites, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 598 days.

(21) Appl. No.: 16/237,825

(22) Filed: Jan. 2, 2019

(65) Prior Publication Data
US 2020/0207398 A1   Jul. 2, 2020

(51) Int. Cl.
*B62D 1/06*   (2006.01)
*F28F 21/02*  (2006.01)
*H05B 3/14*   (2006.01)

(52) U.S. Cl.
CPC ........... *B62D 1/06* (2013.01); *F28F 21/02* (2013.01); *H05B 3/145* (2013.01)

(58) Field of Classification Search
CPC .......... B62D 1/06; B62D 1/065; F25F 21/02; H05B 3/145; H05B 3/58; H05B 3/0042; H05B 1/0236; H05B 2214/04
See application file for complete search history.

(56) References Cited

U.S. PATENT DOCUMENTS

| | | | |
|---|---|---|---|
| 4,547,655 A * | 10/1985 | Kurata | B62D 1/065 219/204 |
| 6,172,342 B1 | 1/2001 | Khafagy et al. | |
| 6,414,270 B1 | 7/2002 | Sugiyama et al. | |
| 2014/0021195 A1 | 1/2014 | Kim et al. | |
| 2017/0038795 A1 * | 2/2017 | Lettow | B60N 2/56 |
| 2017/0354190 A1 * | 12/2017 | Cauchy | B60N 2/5635 |
| 2018/0111527 A1 | 4/2018 | Tait et al. | |
| 2018/0281641 A1 | 10/2018 | Durkee et al. | |

* cited by examiner

*Primary Examiner* — Shawntina T Fuqua
(74) *Attorney, Agent, or Firm* — Vivacqua Crane, PLLC

(57) ABSTRACT

A steering wheel for a vehicle includes a steering wheel core and a graphene heating element on the steering wheel core.

7 Claims, 1 Drawing Sheet

STEERING WHEEL FOR A VEHICLE INCORPORATING A GRAPHENE THERMO-ELECTRIC ELEMENT

FIELD

The present disclosure relates to a steering wheel for a vehicle incorporating a graphene thermo-electric element.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

It is desirable to provide heat to a vehicle steering wheel especially when operating that vehicle in cold environments. Conventional vehicle steering wheels may incorporate an electrically resistive heating element which operates to provide heat to the steering wheel. These systems operate by passing energy in the form of an electric current through a material having high resistance which then converts the energy into heat. These conventional vehicle steering wheel heating systems suffer from a number of problems including the delay in bringing the steering wheel up to a desired temperature, the thickness of the heating element, which limits the design of the steering wheel and which may also adversely affect the ergonomics of the steering wheel, and a relatively high voltage which is required to provide the amount of power consumed by the heating element.

SUMMARY

In an exemplary aspect, a steering wheel for a vehicle includes a steering wheel core and a graphene heating element on the steering wheel core.

In this manner, steering wheel heating is provided which has improved performance, appearance and a reduction in cost.

In another exemplary aspect, the steering wheel core includes a rigid structural support and a rigid foam encapsulating the rigid structural support.

In another exemplary aspect, the steering wheel further includes a cover enclosing the steering wheel core and graphene heating element.

In another exemplary aspect, the cover is leather.

In another exemplary aspect, the graphene heating element has a thickness of about 0.2 millimeters.

In another exemplary aspect, the graphene heating element operates at a voltage of between about five and twelve volts.

In another exemplary aspect, the graphene heating element operates at a current of about 1.2 amps.

In another exemplary aspect, the graphene heating element operates at temperatures between about 45 degrees Celsius and 100 degrees Celsius.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 2:
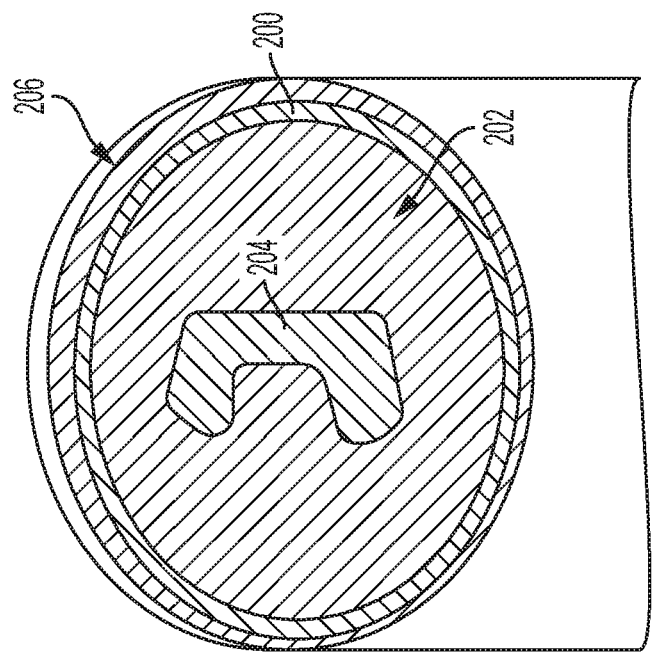
FIG. 2 is a cross-sectional view of the vehicle steering wheel of FIG. 1.
Figure 1:
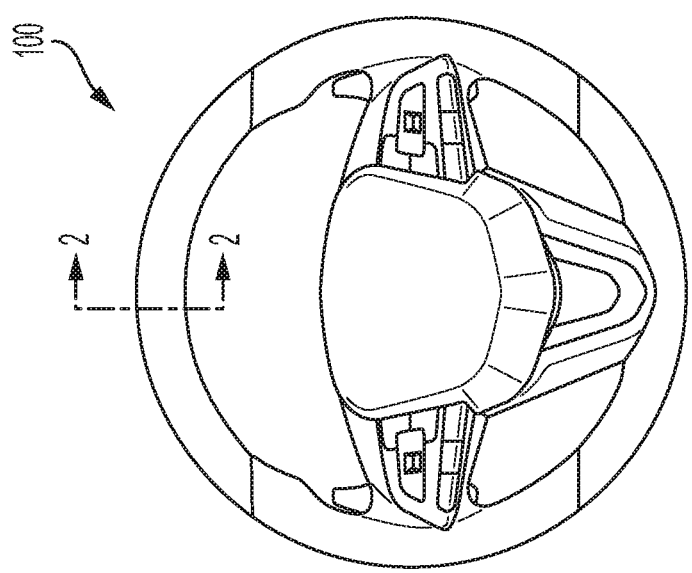
FIG. 1 is a perspective view of a vehicle steering wheel incorporating a graphene thermo-electric element in accordance with an exemplary embodiment of the present application.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a perspective view of a vehicle steering wheel 100 incorporating a graphene thermo-electric element in accordance with an exemplary embodiment of the present application. FIG. 2 is a cross-sectional view of a portion of the vehicle steering wheel 100. The steering wheel 100 includes a graphene heating element 200 that is wrapped around a rigid foam 202. The rigid foam 202 encapsulates a rigid structural support 204 which together may form a steering wheel core. The steering wheel 100 also includes a cover 206 that covers the graphene heating element 200, rigid foam 202 and support 204. The cover 206 may be made of a leather or other material without limitation.

The graphene heating element 200 has a higher heating efficiency than a conventional heating element. Therefore, the graphene heating element 200 in the steering heats up to a desired temperature much faster and reduces the amount of energy required to provide the heat to the steering wheel. In particular, a graphene heating element requires a lower voltage and reduced power to operate. Additionally, in comparison with conventional steering wheel heating elements, a graphene heating element is much thinner which provides greater flexibility in steering wheel design and improved appearance. Further, the cost of a graphene heating element is lower than conventional steering wheel heating elements and has an improved resistance to corrosion.

In an exemplary embodiment, the graphene heating element may have a thickness of about 0.2 millimeters, operate at a voltage of between about five and twelve volts, a current of about 1.2 amps, and providing a heating temperature range of between about 45 degrees Celsius and 100 degrees Celsius.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A steering wheel for a vehicle, the steering wheel comprising:
   a steering wheel core; and
   a graphene heating element on the steering wheel core, the graphene heating element having a thickness of about 0.2 millimeters;
   wherein the graphene heating element operates at a voltage of between about five and twelve volts.

2. The steering wheel of claim 1, wherein the steering wheel core comprises a rigid structural support and a rigid foam encapsulating the rigid structural support.

3. The steering wheel of claim 1, further comprising a cover enclosing the steering wheel core and graphene heating element.

4. The steering wheel of claim 3, wherein the cover comprises a leather.

5. The steering wheel of claim 1, wherein the graphene heating element operates at a current of about 1.2 amps.

6. The steering wheel of claim 1, wherein the graphene heating element operates at temperatures between about 45 degrees Celsius and 100 degrees Celsius.

7. A steering wheel for a vehicle, the steering wheel comprising:
   a steering wheel core; and
   a graphene heating element on the steering wheel core, the graphene heating element having a thickness of about 0.2 millimeters;
   wherein the graphene heating element operates at a current of about 1.2 amps.

* * * * *